N. BOTSFORD.
Vegetable-Slicers.
No. 144,596. Patented Nov. 18, 1873.
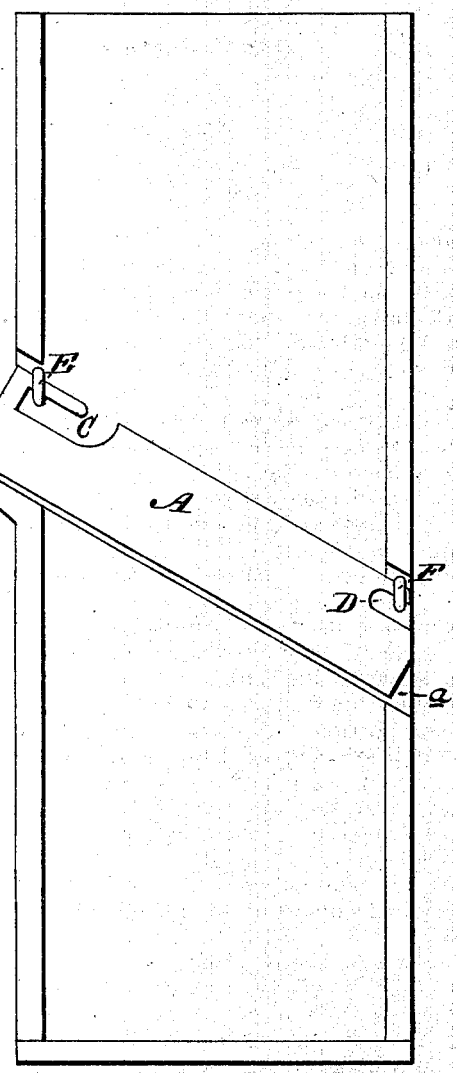
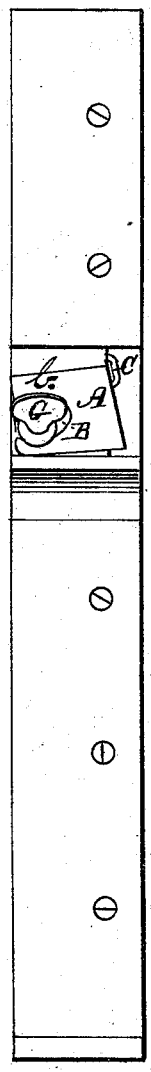
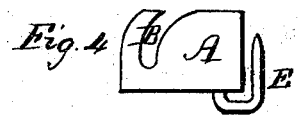
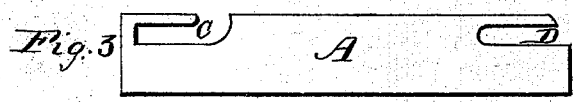
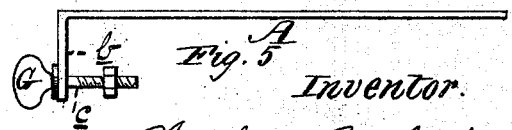
Witnesses:
A. Ransom
Hiram Pierce
Inventor.
Nathan Botsford

UNITED STATES PATENT OFFICE.

NATHAN BOTSFORD, OF LOCKPORT, NEW YORK.

IMPROVEMENT IN VEGETABLE-SLICERS.

Specification forming part of Letters Patent No. 144,596, dated November 18, 1873; application filed August 21, 1873.

*To all whom it may concern:*

Be it known that I, NATHAN BOTSFORD, of Lockport, in the county of Niagara, State of New York, have invented certain Improvements in Vegetable Slicing and Cutting Machines, of which the following is a specification:

This invention has for its object to furnish a simple and effective device for slicing or cutting vegetables, in which the knife may be readily and easily removed from the rectangular frame for sharpening, and may be adjusted at any angle in respect to the said frame, in order to cut or slice the article into any desired size.

The invention consists of a rectangular frame, having a knife or cutter arranged diagonally across the same, fitting within a diagonal recess formed in said frame, the knife having at its rear-end portions hooks or arms, which are adapted to brackets or loops attached to the frame, and one end of the knife being bent at right angles to the main portion, having a curved slot formed in it, by which means the knife may be set at any angle in respect to the frame, and retained in such position by a set-screw, all of which will be fully hereinafter described.

In the drawings, Figure 1 is a top or plan view of a vegetable slicing or cutting machine or board constructed according to my invention; Fig. 2, a side view thereof. Figs. 3, 4, and 5 are detached views of the knife or cutter.

The rectangular frame is, preferably, made of wood, and is provided with a recess extending diagonally across the same, as shown at $a$, and at the rear side of the recess $a$, at each end of the same, is securely fastened loops or brackets E F, for a purpose hereinafter stated. The knife or cutter A is provided on one edge with slots or recesses, to form two arms or hooks, C D, which are placed within the loops E F, as shown in Fig. 1, in order to hold the same in position. One end of the knife A is bent at right angles, as shown at $b$, and this end is provided with a curved slot, B, which is adapted to a bolt, $c$, passing through the side of the frame, and confined in place by a nut, $d$, the other end of the bolt having a thumb-nut, G, by means of which the cutting-blade may be adjusted to any angle in respect to the rectangular frame, for cutting the vegetables of any size, and be retained in such position by screwing up the nut and bolt to press against the end $b$ of the cutting-blade, as shown in Fig. 1. By means of the hooks C D, adapted to the loops or brackets E F, and the end of the blade confined in position by the nut and bolt, the said blade can be removed with ease and facility when the same requires sharpening, and can be replaced with equal rapidity.

I claim—

The cutting-blade A, having the hooks C D and end $b$, with its curved slot B, in combination with the rectangular frame, having the loops E F, and carrying the bolt or screw, all constructed and operating substantially as and for the purpose specified.

NATHAN BOTSFORD.

Witnesses:
  A. RANSOM,
  HIRAM PIERCE.